United States Patent
Chen

(10) Patent No.: US 11,475,907 B2
(45) Date of Patent: Oct. 18, 2022

(54) METHOD AND DEVICE OF DENOISING VOICE SIGNAL

(71) Applicant: GOERTEK TECHNOLOGY CO., LTD., Qingdao (CN)

(72) Inventor: Weiliang Chen, Qingdao (CN)

(73) Assignee: GOERTEK TECHNOLOGY CO., LTD., Qingdao (CN)

(*) Notice: Subject to any disclaimer, the term of this patent is extended or adjusted under 35 U.S.C. 154(b) by 91 days.

(21) Appl. No.: 16/766,236

(22) PCT Filed: Dec. 20, 2017

(86) PCT No.: PCT/CN2017/117553
§ 371 (c)(1),
(2) Date: May 21, 2020

(87) PCT Pub. No.: WO2019/100500
PCT Pub. Date: May 31, 2019

(65) Prior Publication Data
US 2020/0372925 A1     Nov. 26, 2020

(30) Foreign Application Priority Data
Nov. 27, 2017   (CN) .......................... 201711207556.8

(51) Int. Cl.
*G10L 21/0208* (2013.01)
*G10L 17/02* (2013.01)
*G10L 21/0308* (2013.01)

(52) U.S. Cl.
CPC .......... *G10L 21/0208* (2013.01); *G10L 17/02* (2013.01); *G10L 21/0308* (2013.01)

(58) Field of Classification Search
None
See application file for complete search history.

(56) References Cited

U.S. PATENT DOCUMENTS

| 8,639,516 B2* | 1/2014 | Lindahl | G10L 21/0208 |
| | | | 704/275 |
| 9,685,171 B1* | 6/2017 | Yang | G10L 21/0208 |
| 10,089,067 B1* | 10/2018 | Abuelsaad | G06F 3/165 |

(Continued)

FOREIGN PATENT DOCUMENTS

| CN | 102497613 A | 6/2012 |
| CN | 103514884 A | 1/2014 |

(Continued)

OTHER PUBLICATIONS

Chinese Office Action dated Aug. 21, 2020 as received in application No. 201711207556.8.

*Primary Examiner* — Douglas Godbold
(74) *Attorney, Agent, or Firm* — Maschoff Brennan

(57) ABSTRACT

The present disclosure provides a method and a device of denoising a voice signal. The method portion includes the following steps: filtering out an environmental noise signal in an original input signal according to an interference signal related to the environmental noise signal in the original input signal to obtain a first voice signal; obtaining a sample signal matching the first voice signal from a voice signal sample library; and filtering out other noise signal in the first voice signal according to the sample signal matching the first voice signal, to obtain an effective voice signal. The method provided by the present disclosure may effectively filter out the environmental noise signal and other noise signal in the voice signal.

10 Claims, 1 Drawing Sheet

--- filtering out an environmental noise signal in an original input signal according to an interference signal related to the environmental noise signal in the original input signal to obtain a first voice signal ⸺ S101 obtaining a sample signal matching the first voice signal from a voice signal sample library ⸺ S102 filtering out other noise signal in the first voice signal according to the sample signal matching the first voice signal, to obtain an effective voice signal ⸺ S103

(56) References Cited

U.S. PATENT DOCUMENTS

| | | | | |
|---|---|---|---|---|
| 2005/0060142 A1* | 3/2005 | Visser | ................ | G10L 21/0208 704/201 |
| 2006/0282264 A1* | 12/2006 | Denny | ................ | G10L 21/0208 704/233 |
| 2009/0119096 A1* | 5/2009 | Gerl | ................ | H04R 3/12 704/207 |
| 2009/0192796 A1* | 7/2009 | Buck | ................ | G10L 21/0208 704/233 |
| 2012/0123771 A1* | 5/2012 | Chen | ................ | H04R 1/245 704/226 |
| 2014/0243048 A1* | 8/2014 | Kwan | ................ | G10L 21/0208 455/570 |
| 2014/0379343 A1* | 12/2014 | Karimi-Cherkandi | ................ | H04M 1/2475 704/246 |
| 2015/0066500 A1* | 3/2015 | Gomez | ................ | G10L 15/20 704/233 |
| 2015/0111615 A1* | 4/2015 | Chu | ................ | G10L 21/0208 455/563 |
| 2015/0356980 A1* | 12/2015 | Sako | ................ | G10L 21/0208 704/226 |
| 2015/0381822 A1* | 12/2015 | Awano | ................ | H04M 9/082 704/205 |
| 2016/0019909 A1* | 1/2016 | Shi | ................ | G10L 25/21 704/226 |
| 2016/0112817 A1* | 4/2016 | Fan | ................ | H04R 29/004 381/94.7 |
| 2017/0294185 A1* | 10/2017 | Bradley | ................ | G10L 25/51 |
| 2017/0345440 A1* | 11/2017 | Matsuo | ................ | H04R 3/005 |
| 2018/0047412 A1* | 2/2018 | Erkelens | ................ | G10L 25/21 |
| 2018/0336919 A1* | 11/2018 | Bastian | ................ | G10L 15/22 |
| 2020/0058293 A1* | 2/2020 | Zhang | ................ | G10L 15/02 |
| 2020/0227064 A1* | 7/2020 | Xu | ................ | G10L 21/0272 |

FOREIGN PATENT DOCUMENTS

| | | |
|---|---|---|
| CN | 104898836 A | 9/2015 |
| CN | 105719659 A | 6/2016 |
| CN | 105989836 A | 10/2016 |

\* cited by examiner

METHOD AND DEVICE OF DENOISING VOICE SIGNAL

TECHNICAL FIELD

The present disclosure relates to the technical field of signal processing, and in particular to a method and a device of denoising a voice signal.

BACKGROUND

With the development of science and technology, many devices with voice input function have appeared, such as the mobile phone, the robot, the voice sound equipment, etc. In the process of inputting voice signal through the microphone on the earphone by the user, in addition to the voice signal of the user, some noise signals may also be mixed in. These noise signals will cause interference to the voice signal input by the user and reduce the clarity of the effective voice signal.

At present, the Least Mean Square (LMS for short) algorithm is mainly used to perform denoising processing on signal input by the user. The LMS algorithm is mainly used to filter out environmental noise signal. If the signal input by the user is further mixed with voice signal of other people besides the environmental noise signal, an unclear effective voice signal still cannot be obtained after using the LMS algorithm for noise denoising. It can be seen that there is a need for an even more effective noise denoising method for removing various noises from the voice signal to obtain clear and effective voice signal.

SUMMARY

The present disclosure provides a method and a device of denoising voice signal, which are used to remove the environmental noise signal and other noise signal in the voice signal to obtain a clear voice signal.

The present disclosure provides a method of denoising a voice signal, including:

filtering out an environmental noise signal in an original input signal according to an interference signal related to the environmental noise signal in the original input signal to obtain a first voice signal;

obtaining a sample signal matching the first voice signal from a voice signal sample library; and filtering out other noise signal in the first voice signal according to the sample signal matching the first voice signal, to obtain an effective voice signal.

Optionally, the obtaining a sample signal matching the first voice signal from a voice signal sample library, includes:

performing voiceprint recognition on the first voice signal, to obtain a spectrum feature of the first voice signal;

calculating a similarity between the spectrum feature of the first voice signal and a spectrum feature of each sample signal stored in the voice signal sample library; and taking a sample signal with the highest similarity to the spectrum feature of first voice signal as the sample signal matching the first voice signal.

Optionally, the performing voiceprint recognition on the first voice signal, to obtain a spectrum feature of the first voice signal, includes:

performing windowing on the first voice signal to obtain at least one frame of voice signal;

performing Fourier transform on the at least one frame of voice signal to obtain at least one frame of frequency domain signal; and extracting a spectrum feature of the at least one frame of frequency domain signal to obtain the spectrum feature of the first voice signal.

Optionally, the extracting a spectrum feature of the at least one frame of frequency domain signal to obtain the spectrum feature of the first voice signal, includes:

selecting one frame of frequency domain signal from the at least one frame of frequency domain signal as a first frequency domain signal;

mapping a signal amplitude at each frequency in the first frequency domain signal to a grayscale value in accordance with a preset amplitude-grayscale mapping relationship; and taking the grayscale value corresponding to each frequency in the first frequency domain signal as the spectrum feature of the first voice signal.

Optionally, the filtering out other noise signal in the first voice signal according to the sample signal matching the first voice signal, to obtain an effective voice signal, includes:

calculating other noise value in each frame frequency domain signal by adopting a least mean square algorithm according to the sample signal matching the first voice signal;

subtracting other noise value in each frame frequency domain signal from each frame frequency domain signal to obtain an effective frequency domain signal of each frame;

performing inverse Fourier transform on the effective frequency domain signal of each frame to obtain an effective time domain signal of each frame; and combining the effective time domain signal of each frame in sequence to obtain the effective voice signal.

Optionally, prior to the filtering out an environmental noise signal in an original input signal according to an interference signal related to the environmental noise signal in the original input signal, the method further includes:

collecting the original input signal through a first microphone within a first specified distance from a sound source; and collecting the interference signal through a second microphone outside the first specified distance and within a second specified distance from the sound source;

and where the second specified distance is greater than the first specified distance.

Optionally, the filtering out an environmental noise signal in an original input signal according to an interference signal related to the environmental noise signal in the original input signal to obtain a first voice signal, includes:

filtering out environmental noise signal in the original input signal by adopting a least mean square algorithm according to the interference signal related to the environmental noise signal in the original input signal to obtain the first voice signal.

The present disclosure further provides an electronic device, including: a processor and a memory connected to the processor;

the memory is used to store one or more computer instructions; and the processor is used to execute the one or more computer instructions for:

filtering out an environmental noise signal in an original input signal according to an interference signal related to the environmental noise signal in the original input signal to obtain a first voice signal;

obtaining a sample signal matching the first voice signal from a voice signal sample library; and filtering out other noise signal in the first voice signal according to the sample signal matching the first voice signal, to obtain an effective voice signal.

Optionally, when obtaining a sample signal matching the first voice signal from a voice signal sample library, the processor is specifically used for:

performing voiceprint recognition on the first voice signal, to obtain a spectrum feature of the first voice signal;

calculating a similarity between the spectrum feature of the first voice signal and a spectrum feature of each sample signal stored in the voice signal sample library; and taking a sample signal with the highest similarity to the spectrum feature of first voice signal as the sample signal matching the first voice signal.

Optionally, when performing voiceprint recognition on the first voice signal, to obtain a spectrum feature of the first voice signal, the processor is specifically used for:

performing windowing on the first voice signal to obtain at least one frame of voice signal;

performing Fourier transform on the at least one frame of voice signal to obtain at least one frame of frequency domain signal; and extracting a spectrum feature of the at least one frame of frequency domain signal to obtain the spectrum feature of the first voice signal.

In the present disclosure, by filtering out the environmental noise signal in the original input signal to obtain the first voice signal, the first noise denoising of the original input signal is achieved, that is, the environmental noise signal is filtered out; on this basis, other noise signal in the first voice signal is filtered out according to the sample signal matching the first voice signal to obtain the effective voice signal, so that the effective voice signal emitted by the user can be remained in accordance with the sample signal matching the first voice signal, and other noise signal other than the effective signal is filtered out, thereby the second noise denoising is achieved. Especially when other noise signal is the voice emitted by other speaker, the other noise signal can be effectively filtered out according to the sample signal. In the present embodiment, by twice noise denoising, the environmental noise signal and other noise signal in the original input signal are sequentially filtered out, and the effective voice signal obtained is clearer.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

The technical solutions provided by the embodiments of the present disclosure will be described in detail below with reference to the drawings.

Figure 1:
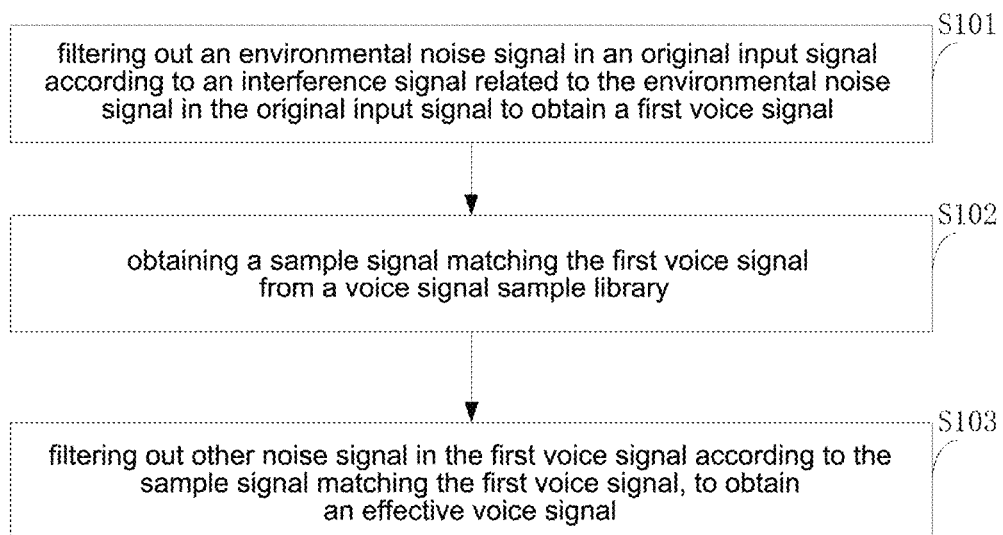
FIG. 1 is a schematic flowchart of a method of denoising a voice signal according to an embodiment of the present disclosure.

FIG. 1 is a schematic flowchart of a method of denoising a voice signal according to an embodiment of the present disclosure. As shown in FIG. 1, the method includes the following steps:

S101: filtering out an environmental noise signal in an original input signal according to an interference signal related to the environmental noise signal in the original input signal to obtain a first voice signal.

S102: obtaining a sample signal matching the first voice signal from a voice signal sample library.

S103: filtering out other noise signal in the first voice signal according to the sample signal matching the first voice signal, to obtain an effective voice signal.

The original input signal refers to a voice signal input by a user through a microphone on a device such as a headset or a mobile phone. Due to the presence of environmental noise and other speakers, the original input signal may further include environmental noise signal and other noise signal in addition to the effective voice signal emitted by the user. The environmental noise signal refers to the sound signal that interferes with the surrounding living environment generated in industrial production, building construction, transportation and social life. Other noise signal may refer to noise signal other than environmental noise, such as voice signal emitted by speakers other than the user.

In the present embodiment, the original input signal is first subjected to the first denoising processing to filter out the environmental noise signal in the original input signal. Then, the voice signal after the first noise denoising processing is subjected to the second denoising processing to filter out other noise signal such as the voice signal emitted by other speakers, thereby a clearer voice signal is obtained. For convenience of description, the finally obtained voice signal is called an effective voice signal.

The process of performing twice denoising processing on the original input signal is described in detail below.

The first denoising processing: filtering the environmental noise signal in the original input signal according to the interference signal related to the environmental noise signal in the original input signal to obtain the first voice signal (i.e., step S101).

The interference signal is signal collected from the environment same with the environment of the original input signal. For example, if the original input signal is collected from a rainy environment, then the interference signal is also collected from a rainy environment. The interference signal is mainly composed of the environmental noise signal, and has a relationship with the environmental noise signal that changes with each other, that is, the interference signal is related to the environmental noise signal.

Based on the correlation between the interference signal and the environmental noise signal, a signal approximating to the environmental noise signal may be obtained by adopting denoising algorithm, such as a least mean square algorithm, according to the interference signal. Then a signal obtained according to the interference signal is subtracted from the original input signal to obtain a voice signal with the environmental noise signal being filtered out. For convenience of description, the voice with the environmental noise signal being filtered out is referred to as the first voice signal.

In addition to the effective voice signal, the first voice signal may further include other noise signal. On this basis, the first voice signal is subjected to the second denoising processing below.

The second denoising processing: obtaining a sample signal matching the first voice signal from the voice signal sample library (i.e., step S102); and filtering out the other noise signal in the first voice signal according to the sample signal matching the first voice signal to obtain the effective voice signal (i.e., step S103).

At least one sample signal is stored in the voice signal sample library. These sample signals may be voice signals input by the user in a relatively quiet environment in advance, and these sample signals may be considered as effective voice signals that do not include noise. One user may correspond to one sample signal or multiple sample signals. For example, the user may store one sample signal respectively when the user's throat is in normal and inflamed situations.

The matching of the sample signal with the first voice signal refers to the matching of the time domain waveforms, spectrum features, or statistical characteristics of the sample signal and the first voice signal being matched. If the first voice signal matches the sample signal, it means that the first voice signal includes the effective voice signal emitted by the user, and then the first voice signal may be subjected to denoising processing again according to the sample signal to obtain the effective voice signal.

Based on the match between the first voice signal and the sample signal, the sample signal has a correlation with the effective voice signal in the first voice signal, but no correlation with other noise signal. On this basis, the signal related to the sample signal is retained according to the sample signal, that is, the effective voice signal; and the signal not related to the sample signal is filtered out, that is, other noise signal.

In an example, the other noise signal is, for example, the voice signal of other speakers. Taking the sample signal matching the first voice signal as signal A. Since the vocal system of other speaker is different from the vocal system of the user, the voice signal emitted by other speaker is not related to the signal A. On this basis, the voice signal of other speaker in the first voice signal can be filtered out to obtain the effective voice signal emitted by the user.

In the present embodiment, by filtering out the environmental noise signal in the original input signal to obtain the first voice signal, the first noise denoising of the original input signal is achieved, that is, the environmental noise signal is filtered out; on this basis, other noise signal in the first voice signal is filtered out according to the sample signal matching the first voice signal to obtain the effective voice signal, so that the effective voice signal emitted by the user can be remained in accordance with the sample signal matching the first voice signal, and other noise signal other than the effective signal is filtered out, thereby the second noise denoising is achieved. Especially when other noise signal is the voice emitted by other speaker, the other noise signal can be effectively filtered out according to the sample signal. In the present embodiment, by twice noise denoising, the environmental noise signal and other noise signal in the original input signal are sequentially filtered out, and the effective voice signal obtained is clearer.

In the above embodiment or the following embodiment, the obtaining a sample signal matching the first voice signal from the voice signal sample library includes: performing voiceprint recognition on the first voice signal, to obtain a spectrum feature of the first voice signal; calculating a similarity between the spectrum feature of the first voice signal and a spectrum feature of each sample signal stored in the voice signal sample library; and taking a sample signal with the highest similarity to the spectrum feature of first voice signal as the sample signal matching the first voice signal.

The voiceprint is the sound wave spectrum carrying verbal information displayed by the electroacoustic instrument. By performing voiceprint recognition on the first voice signal, the sound wave spectrum carrying the verbal information in the first voice signal may be obtained, and then the feature of the sound wave spectrum is extracted from the sound wave spectrum as the spectrum feature of the first voice signal.

The spectrum features of the voice signal of different people are different. If the spectrum feature of the two voice signals are more similar, the higher the probability that the speakers of the two voice signals are the same person, the more the two voice signals match. On this basis, the similarity between the spectral feature of the first voice signal and the spectral feature of each sample signal stored in the voice signal sample library is calculated; and the sample signal with the highest similarity to the spectral feature of the first voice signal is taken as the sample signal matching the first voice signal.

Optionally, in addition to storing at least one sample signal in the voice signal sample library, the spectrum feature corresponding to each sample signal may also be stored therein, so that the similarity between the first voice signal and each sample signal may be directly compared.

Optionally, a difference between the amplitudes of the first voice signal and each sample signal at the same frequency may be calculated. A larger difference indicates that the similarity between the first voice signal and the sample signal is lower, and the probability that the first voice signal includes the voice signal emitted by the user is smaller; and a smaller the difference indicates that the similarity between the first voice signal and the sample signal is higher, and the probability that the first voice signal includes the voice signal emitted by the user is larger. On this basis, the sample signal with the highest similarity to the spectrum feature of the first voice signal is taken as the sample signal matching the first voice signal.

In the voice signal sample library, the user's voice signal may not be stored, so there is no sample signal matching the first voice signal. On this basis, a similarity threshold may be set. The sample signal with the highest similarity to the spectral feature of the first voice signal and the similarity greater than the similarity threshold is used as the sample signal matching the first voice signal, and then the subsequent denoising operation is performed. If there is no sample signal in the voice signal sample library that has the highest similarity to the spectrum feature of the first voice signal and the similarity is greater than the similarity threshold, the first voice signal may be directly used as the effective voice signal, and the operation ends.

In the above embodiment or the following embodiment, in the process of performing voiceprint recognition on the first voice signal to obtain the spectrum feature of the first voice signal, the first voice signal may be windowed first to obtain at least one frame of voice signal; then, Fourier transform is performed on the at least one frame of voice signal to obtain at least one frame of frequency domain signal; next, the spectrum feature of at least one frame of frequency domain signal is extracted to obtain the spectrum feature of the first voice signal.

When using a computer for signal processing, the infinite length signal cannot be processed, but a limited time segment is taken for analysis; moreover, since the voice signal is a short-term stationary signal, it is generally considered that the feature of the voice signal is basically constant or slow within 10-30 ms, so a small segment of the voice signal may be intercepted for spectrum analysis. On this basis, the first voice signal may be split into a signal of at least one time segment through a window function, and the signal of each time segment may be called one frame of voice signal. The length of the time segment may be any time period from 10 to 30 ms.

Optionally, if the time length of the first voice signal is 10 to 30 ms, the first voice signal may be directly used as a frame of voice signal without windowing the first voice signal.

At least one frame of the voice signal is a time domain signal. In order to obtain the spectrum feature of the voice signal in the frequency domain, at least one frame of the voice signal may be subjected to Fourier transform to obtain at least one frame of the frequency domain signal. Optionally, a fast Fourier transform (FFT for short) may be performed on at least one frame of the voice signal. FFT is a general term for the efficient and fast calculation method of computing discrete Fourier transform (DFT for short) by computer. Using this algorithm may greatly reduce the number of multiplications required by the computer to calculate the discrete Fourier transform. In particular, the more sampling points that are transformed, the more significant the savings in FFT algorithm calculation.

Next, the spectrum feature of at least one frame of frequency domain signal is extracted from at least one frame of frequency domain signal to obtain the spectrum feature of the first voice signal.

For each frame of voice signal, the spectrum feature is almost the same. Therefore, one frame of frequency domain signal may be selected as the first frequency domain signal from at least one frame of frequency domain signal; and the spectrum feature of the first frequency domain signal may be extracted as the spectrum feature of the first voice signal.

Optionally, any one frame may be selected from at least one frame of frequency domain signals as the first frequency domain signal.

The frequency spectrum of the voice signal refers to the corresponding relationship between each frequency of the voice signal and the signal amplitude. In order to clearly and intuitively reflect the spectrum feature of the voice signal, an amplitude-grayscale mapping relationship may be preset, and the signal amplitude corresponding to each frequency may be expressed in a corresponding grayscale. Optionally, the amplitude range where the signal amplitude corresponding to each frequency is located is quantized into 256 quantized values, 0 represents black, and 255 represents white. The larger the amplitude value, the smaller the corresponding grayscale value.

Then, in the amplitude-grayscale mapping relationship, the grayscale value corresponding to the signal amplitude at each frequency in the first frequency domain signal is searched to map the signal amplitude at each frequency to the grayscale value. Then, the grayscale value corresponding to each frequency in the first frequency domain signal is used as the spectral feature of the first voice signal.

Figure 2:
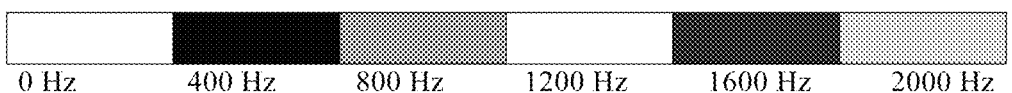
FIG. 2 is a grayscale value corresponding to each frequency in a first frame frequency domain signal according to yet another embodiment of the present disclosure.

In an example, as shown in FIG. 2, each frequency in the first frequency domain signal are, for example, 0 Hz, 400 Hz, 800 Hz, 1200 Hz, 1600 Hz, and 2000 Hz. The grayscale values corresponding to each frequency are 255, 0, 155, 255, 50, and 200, respectively. The grayscale values corresponding to these frequencies are the spectrum feature of the first voice signal.

Optionally, in addition to taking the grayscale value corresponding to each frequency in the first frequency domain signal as the spectral feature of the first voice signal, the envelope information corresponding to the frequency-decibel curve of the first frequency domain signal may also be taken as spectrum feature of the first voice signal.

Optionally, the amplitude corresponding to each frequency in the first frequency domain signal is logarithmically calculated to obtain the decibel corresponding to each frequency, and then the corresponding relationship between each frequency and decibel is obtained. Then, the frequency-decibel curve is obtained according to the corresponding relationship between each frequency and the decibel, and then the envelope information corresponding to the frequency-decibel curve is obtained.

After obtaining the grayscale value corresponding to each frequency in the first frequency domain signal, a sample signal similar to the grayscale value corresponding to each frequency in the first frequency domain signal may be obtained from the voice signal sample library.

Optionally, the grayscale value corresponding to each frequency in the sample signal may be pre-stored in the voice signal sample library. If the difference between the grayscale value corresponding to each frequency in the first frequency domain signal and the grayscale value corresponding to the same frequency in the sample signal is within the specified threshold range, it can be considered that the sample signal matches the first frequency domain signal. Further, the sample signal matches the first voice signal.

The method for obtaining the grayscale value corresponding to each frequency in the sample signal is similar to the method for obtaining the grayscale value corresponding to each frequency in the first frequency domain signal. For one sample signal, the sample signal input by the user may be received, and this sample signal is a time domain signal. Then, the time domain sample signal is windowed and Fourier transformed to obtain at least one frame frequency domain sample signal. One frame frequency domain sample signal is selected from at least one frame frequency domain sample signal as the first frequency domain sample signal. According to the preset amplitude-grayscale mapping relationship, the signal amplitude at each frequency in the first frequency domain sample signal is mapped to a grayscale value.

Further, the grayscale value corresponding to each frequency in the first frequency domain sample signal is taken as the spectral feature of the first frequency domain sample, that is, the spectral feature of the sample signal.

It is worth noting that the frame length of each frame frequency domain signal should be the same as the frame length of each frame sample signal. If the time length of one frame frequency domain signal is 10 ms, the frame length of the sample signal matching the frame frequency domain signal should be 10 ms.

In the above embodiment or the following embodiment, the filtering other noise signal in the first voice signal according to the sample signal matching the first voice signal to obtain the effective voice signal includes: calculating the other noise value in each frame frequency domain signal by adopting least mean square algorithm according to the sample signal matching the first voice signal; subtracting the other noise value in each frame frequency domain signal from each frame frequency domain signal to obtain an effective frequency domain signal of each frame; performing inverse Fourier transform on the effective frequency domain signal of each frame to obtain an effective time domain signal of each frame; and combining the effective time domain signal of each frame in sequence to obtain the effective voice signal.

The least mean square algorithm is based on the minimum mean square value of the error between the expected response and the output signal, which is based on the input signal to estimate the gradient vector during the iteration process and update the weight coefficient to achieve the optimal adaptive iteration. The least mean square algorithm is a gradient fastest descent method, and its obvious characteristics and advantages are simplicity and speed.

The first voice signal may be converted into at least one frame frequency domain signal. For each frame frequency domain signal in the at least one frame frequency domain signal, the method of filtering other noise signal is the same. The following takes the first frame frequency domain signal as an example to describe a method of filtering other noise signal in the first frame frequency domain signal.

Using the weight function, the first frame frequency domain signal is subjected to weighing processing to obtain a first frame weighted signal. The sample signal matching the first voice signal and the first weighted signal are taken as inputs, and other noise value in the frequency domain signal of the first frame is used as the desired output. After the least mean square algorithm, the weight function in the first frame weighted signal is iterated many times, so that the first frame weighted signal is approximated to the sample signal. When the first frame weighted signal approaches the sample signal, the weight function may be called the optimal weight function.

Optionally, the weight function in the first frame weighted signal may be iterated a specified number of times to obtain the optimal weight function; and the weight function in the first frame weighted signal may also be iterated multiple times, when the difference between the first frame weighted signal and the sample signal is within the specified error range, the obtained weight function is the optimal weight function.

Then, the product of the optimal weight function and the signal in the frequency domain of the first frame is subtracted from the sample signal to obtain other noise value. Finally, other noise value in the first frame frequency domain signal is subtracted from the first frame frequency domain signal to obtain an effective signal in the first frame frequency domain signal. Similarly, the effective voice signal in the frequency domain signal of each frame may be obtained.

The effective voice signal in the frequency domain signal of each frame obtained above is a frequency domain signal, and it must be converted into a time domain signal. On this basis, inverse Fourier transform is performed on the effective frequency domain signal of each frame to obtain the effective time domain signal of each frame; then, the effective time domain signal of each frame is sequentially combined in time sequence to establish the connection relationship between the frames to get the effective voice signal in the time domain. The effective voice signal in the time domain is a signal that removes environmental noise signal and other noise signal, and may be used for operations such as output to a speaker, voice recognition, and voice communication.

Optionally, similar to the method for filtering other noise signal, the least mean square algorithm may also be used in the present embodiment to filter out the environmental noise in the original input signal according to the interference signal related to the environmental noise signal in the original input signal to obtain the first voice signal.

First, as shown in formula (1), the interference signal is weighted to obtain a weighted signal.

$$y(n)=w(n)\times(n),\ n=1,\ldots,M;\ x(n)=N_1(n) \qquad (1)$$

M is the number of iterations, x(n) is the interference signal, and w(n) is the weight function.

The original input signal $d(n)=s(n)+N_0(n)$, where s(n) is the first voice signal and $N_0(n)$ is the environmental noise signal. Where, $N_0(n)$ is related to $N_1(n)$.

Then, the interference signal and the original input signal are used as input, and the first voice signal is used as the expected output. After the least mean square algorithm, the weight function in the weighted signal is iterated multiple times to make the weighted signal approximate the environmental noise signal. The weight function at this time may be called the optimal weight function. Then, the product of the optimal weight function and the interference signal is subtracted from the original input signal to obtain the first voice signal.

Specifically, the expected output is the difference between the original input signal and the weighted signal, that is, the error signal, as shown in equation (2).

$$e(n)=d(n)-y(n)=s(n)+N_0(n)-y(n) \qquad (2)$$

The mean square error of the expected output is:

$$E[e^2(n)] = E[(s(n) + N_0(n) - y(n))^2] \qquad (3)$$
$$= E[s^2(n)] + E[(N_0(n) - y(n))^2] +$$
$$2E[s(n) \cdot (N_0(n) - y(n))]$$

Since s(n) is not related to $N_0(n)$, and s(N) is not related to $N_1(n)$, there is formula (4)

$$E[s(n)\cdot(N_0(n)-y(n))]=0 \qquad (4)$$

Further, formula (4) is substituted into formula (3) to obtain formula (5)

$$E[e^2(n)]=E[s^2(n)]+E[(N_0(n)-y(n))^2] \qquad (5)$$

Since s(n) is a fixed value, if $E[e^2(n)]$ is the minimum value, there is formula (6)

$$N_0(n)=y(n)=w(n)\times(n)=w(n)N_1(n) \qquad (6)$$

Further, the formula (6) is substituted into the formula (5) to obtain the formula (7)

$$e(n)=s(n) \qquad (7)$$

At the beginning of the least mean square algorithm, the weight function may be set to 0, and then the weight function is adaptively updated. The adaptive update process of the weight function is as follows.

As shown in formula (8), the error signal e(n) is calculated.

$$e(n)=d(n)-y(n)=d(n)-w(n)\times(n) \qquad (8)$$

Then, the error mean square error $\xi(n)$ of the error signal e(n) is calculated.

$$\xi(n)=E[e^2(n)]=E[d^2(n)-2d(n)y(n)+y^2(n)] \qquad (9)$$

Let R be the autocorrelation matrix of x(n) and p is the cross-correlation matrix of x(n) and d(n), then formula (10) may be obtained according to formula (9).

$$\xi(n)=E[e^2(n)]=E[d^2(n)]+w(n)Rw(n)-2Pw(n) \quad (10)$$

Then, the mean square error gradient is calculated:

$$\frac{\partial \xi}{\partial w}=\nabla = 2Rw(n)-2P \quad (11)$$

Simplified error mean square deviation gradient:

$$\nabla=-2e(n)\times(n) \quad (12)$$

Continue to iterate the weight function until the number of iterations is M. The updated weight function may be expressed as:

$$w(n+1)=w(n)+2\mu e(n)\times(n) \quad (13)$$

μ is a relatively small value, so that the update algorithm of the weight function is convergent, thereby ensuring the accuracy of the algorithm.

After obtaining the weight function in each iteration, the weight function may be substituted into formula (6) to obtain a weighted signal approximate to the environmental noise signal, that is, y(n). Then, by subtracting the weighted signal from the original signal, that is, d(n)−y(n), the first voice signal filtered out of the environmental noise signal is obtained.

In the above embodiment or the following embodiment, in order to accurately collect the interference signal and the original input signal, before filtering out the environmental noise signal in the original input signal according to the interference signal related to the environmental noise signal in the original input signal, the original input signal may be collected by a first microphone that is within a first specified distance from the sound source; and the interference signal may be collected by a second microphone that is outside the first specified distance and within a second specified distance from the sound source. The second specified distance is greater than the first specified distance.

If the first microphone and the second microphone are installed on the headset and the sound source is the user's mouth, the first microphone may be set at a position within a first specified distance from the user's mouth, that is, close to position of the user's mouth, for example, the position on the headset corresponding to the corner of the mouth. The second microphone may be disposed at a position outside the first specified distance from the user's mouth and within a second specified distance, that is, a position away from the user's mouth, for example, a position on the headphone corresponding to the top of the head.

In the present embodiment, the first microphone and the second microphone should be in the same environment, so that the environmental noise signal in the original input signal collected by the first microphone is related to the interference signal collected by the second microphone. The first microphone is close to the sound source, and the second microphone is far away from the sound source, so that most of the original input signal collected by the first microphone is the effective voice signal, and a small part is the environmental noise signal and other noise signal; and most of the interference signal collected by the second microphone is environmental noise signal, and a small part is effective voice signal. On this basis, the environmental noise signal in the original input signal collected by the first microphone may be filtered out according to the interference signal collected by the second microphone to obtain the first voice signal.

Figure 3:
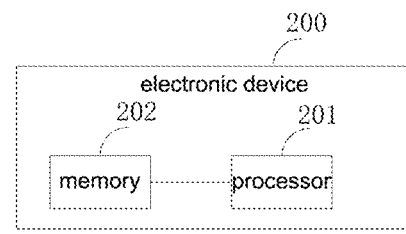
FIG. 3 is a schematic structural diagram of an electronic device according to yet another embodiment of the present disclosure.

FIG. 3 is a schematic structural diagram of an electronic device according to yet another embodiment of the present disclosure. As shown in FIG. 3, the electronic device 200 includes a processor 201, and a memory 202 connected to the processor 201;

The memory 202 is used to store one or more computer instructions.

The processor 201 is used to execute one or more computer instructions for:

filtering out an environmental noise signal in an original input signal according to an interference signal related to the environmental noise signal in the original input signal to obtain a first voice signal; obtaining a sample signal matching the first voice signal from a voice signal sample library; and filtering out other noise signal in the first voice signal according to the sample signal matching the first voice signal, to obtain an effective voice signal.

In the present embodiment, by filtering out the environmental noise signal in the original input signal to obtain the first voice signal, the first noise denoising of the original input signal is achieved, that is, the environmental noise signal is filtered out; on this basis, other noise signal in the first voice signal is filtered out according to the sample signal matching the first voice signal to obtain the effective voice signal, so that the effective voice signal emitted by the user can be remained in accordance with the sample signal matching the first voice signal, and other noise signal other than the effective signal is filtered out, thereby the second noise denoising is achieved. Especially when other noise signal is the voice emitted by other speaker, the other noise signal can be effectively filtered out according to the sample signal. In the present embodiment, by twice noise denoising, the environmental noise signal and other noise signal in the original input signal are sequentially filtered out, and the effective voice signal obtained is clearer.

Optionally, when obtaining a sample signal matching the first voice signal from a voice signal sample library, the processor 201 is specifically used for: performing voiceprint recognition on the first voice signal, to obtain a spectrum feature of the first voice signal; calculating a similarity between the spectrum feature of the first voice signal and a spectrum feature of each sample signal stored in the voice signal sample library; and taking a sample signal with the highest similarity to the spectrum feature of first voice signal as the sample signal matching the first voice signal.

Optionally, when performing voiceprint recognition on the first voice signal, to obtain a spectrum feature of the first voice signal, the processor 201 is specifically used for: performing windowing on the first voice signal to obtain at least one frame of voice signal; performing Fourier transform on the at least one frame of voice signal to obtain at least one frame of frequency domain signal; and extracting a spectrum feature of the at least one frame of frequency domain signal to obtain the spectrum feature of the first voice signal.

Optionally, when extracting a spectrum feature of the at least one frame of frequency domain signal to obtain the spectrum feature of the first voice signal, the processor 201 is specifically used for: selecting one frame of frequency domain signal from the at least one frame of frequency domain signal as a first frequency domain signal; mapping a signal amplitude at each frequency in the first frequency domain signal to a grayscale value in accordance with a preset amplitude-grayscale mapping relationship; and taking the grayscale value corresponding to each frequency in the first frequency domain signal as the spectrum feature of the first voice signal.

Optionally, when filtering out other noise signal in the first voice signal according to the sample signal matching the first voice signal, to obtain an effective voice signal, the processor 201 is specifically used for: calculating other noise value in each frame frequency domain signal by adopting a least mean square algorithm according to the sample signal matching the first voice signal; subtracting other noise value in each frame frequency domain signal from each frame frequency domain signal to obtain an effective frequency domain signal of each frame; performing inverse Fourier transform on the effective frequency domain signal of each frame to obtain an effective time domain signal of each frame; and combining the effective time domain signal of each frame in sequence to obtain the effective voice signal.

Optionally, prior to the filtering out an environmental noise signal in an original input signal according to an interference signal related to the environmental noise signal in the original input signal, the processor 201 is further used for: collecting the original input signal through a first microphone within a first specified distance from a sound source; and collecting the interference signal through a second microphone outside the first specified distance and within a second specified distance from the sound source; and where the second specified distance is greater than the first specified distance.

Optionally, when the filtering out an environmental noise signal in an original input signal according to an interference signal related to the environmental noise signal in the original input signal to obtain a first voice signal, the processor 201 is specifically used for: filtering out environmental noise signal in the original input signal by adopting a least mean square algorithm according to the interference signal related to the environmental noise signal in the original input signal to obtain the first voice signal.

The embodiment of the present disclosure also provides a computer storage medium that stores one or more computer instructions. When the one or more computer instructions are executed by a computer, it may be implemented: filtering out an environmental noise signal in an original input signal according to an interference signal related to the environmental noise signal in the original input signal to obtain a first voice signal; obtaining a sample signal matching the first voice signal from a voice signal sample library; and filtering out other noise signal in the first voice signal according to the sample signal matching the first voice signal, to obtain an effective voice signal.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

What is claimed is:

1. A method of denoising a voice signal, comprising:
   filtering out an environmental noise signal in an original input signal according to an interference signal related to the environmental noise signal in the original input signal to obtain a first voice signal;
   obtaining a sample signal matching the first voice signal from a voice signal sample library; and
   filtering out other noise signal in the first voice signal according to the sample signal matching the first voice signal, to obtain an effective voice signal;
   wherein the obtaining a sample signal matching the first voice signal from a voice signal sample library, comprises:
   performing voiceprint recognition on the first voice signal, and obtaining a spectrum feature of the first voice signal from the first voice signal after being voiceprint recognized; and
   obtaining a sample signal matching the first voice signal from a voice signal sample library according to the spectrum feature of the first voice signal;
   wherein the performing voiceprint recognition on the first voice signal, and obtaining a spectrum feature of the first voice signal from the first voice signal after being voiceprint recognized, comprises:
   performing windowing on the first voice signal to obtain at least one frame of voice signal;
   performing Fourier transform on the at least one frame of voice signal to obtain at least one frame of frequency domain signal; and
   extracting a spectrum feature of the at least one frame of frequency domain signal to obtain the spectrum feature of the first voice signal;
   wherein the extracting a spectrum feature of the at least one frame of frequency domain signal to obtain the spectrum feature of the first voice signal, comprises:
   selecting one frame of frequency domain signal from the at least one frame of frequency domain signal as a first frequency domain signal;
   mapping a signal amplitude at each frequency in the first frequency domain signal to a grayscale value in accordance with a preset amplitude-grayscale mapping relationship; and
   taking the grayscale value corresponding to each frequency in the first frequency domain signal as the spectrum feature of the first voice signal.

2. The method according to claim 1, wherein the obtaining a sample signal matching the first voice signal from a voice signal sample library according to the spectrum feature of the first voice signal, comprises:
   calculating a similarity between the spectrum feature of the first voice signal and a spectrum feature of each sample signal stored in the voice signal sample library; and
   taking a sample signal with the highest similarity to the spectrum feature of first voice signal as the sample signal matching the first voice signal.

3. The method of claim 1, wherein the filtering out other noise signal in the first voice signal according to the sample signal matching the first voice signal, to obtain an effective voice signal, comprises:
   calculating other noise value in each frame frequency domain signal by adopting a least mean square algorithm according to the sample signal matching the first voice signal;
   subtracting other noise value in each frame frequency domain signal from each frame frequency domain signal to obtain an effective frequency domain signal of each frame;
   performing inverse Fourier transform on the effective frequency domain signal of each frame to obtain an effective time domain signal of each frame; and combining the effective time domain signal of each frame in sequence to obtain the effective voice signal.

4. The method according to claim 1, wherein prior to the filtering out an environmental noise signal in an original input signal according to an interference signal related to the environmental noise signal in the original input signal, the method further comprising:
  collecting the original input signal through a first microphone within a first specified distance from a sound source; and
  collecting the interference signal through a second microphone outside the first specified distance and within a second specified distance from the sound source;
  and wherein the second specified distance is greater than the first specified distance.

5. The method according to claim 1, wherein the filtering out an environmental noise signal in an original input signal according to an interference signal related to the environmental noise signal in the original input signal to obtain a first voice signal, comprises:
  filtering out environmental noise signal in the original input signal by adopting a least mean square algorithm according to the interference signal related to the environmental noise signal in the original input signal to obtain the first voice signal.

6. An electronic device, comprising: a processor and a memory connected to the processor;
  the memory is used to store one or more computer instructions; and
  the processor is used to execute the one or more computer instructions for:
  filtering out an environmental noise signal in an original input signal according to an interference signal related to the environmental noise signal in the original input signal to obtain a first voice signal;
  obtaining a sample signal matching the first voice signal from a voice signal sample library; and
  filtering out other noise signal in the first voice signal according to the sample signal matching the first voice signal, to obtain an effective voice signal;
  wherein the obtaining a sample signal matching the first voice signal from a voice signal sample library, comprises:
  performing voiceprint recognition on the first voice signal, and obtaining a spectrum feature of the first voice signal from the first voice signal after being voiceprint recognized; and
  obtaining a sample signal matching the first voice signal from a voice signal sample library according to the spectrum feature of the first voice signal;
  wherein when performing voiceprint recognition on the first voice signal, and obtaining a spectrum feature of the first voice signal from the first voice signal after being voiceprint recognized, the processor is specifically used for:
  performing windowing on the first voice signal to obtain at least one frame of voice signal;
  performing Fourier transform on the at least one frame of voice signal to obtain at least one frame of frequency domain signal; and
  extracting a spectrum feature of the at least one frame of frequency domain signal to obtain the spectrum feature of the first voice signal;
  wherein when extracting a spectrum feature of the at least one frame of frequency domain signal to obtain the spectrum feature of the first voice signal, the processor is specifically used for:
  selecting one frame of frequency domain signal from the at least one frame of frequency domain signal as a first frequency domain signal;
  mapping a signal amplitude at each frequency in the first frequency domain signal to a grayscale value in accordance with a preset amplitude-grayscale mapping relationship; and
  taking the grayscale value corresponding to each frequency in the first frequency domain signal as the spectrum feature of the first voice signal.

7. The electronic device according to claim 6, wherein when obtaining a sample signal matching the first voice signal from a voice signal sample library according to the spectrum feature of the first voice signal, the processor is specifically used for:
  calculating a similarity between the spectrum feature of the first voice signal and a spectrum feature of each sample signal stored in the voice signal sample library; and
  taking a sample signal with the highest similarity to the spectrum feature of first voice signal as the sample signal matching the first voice signal.

8. The electronic device according to claim 6, wherein when filtering out other noise signal in the first voice signal according to the sample signal matching the first voice signal, to obtain an effective voice signal, the processor is specifically used for:
  calculating other noise value in each frame frequency domain signal by adopting a least mean square algorithm according to the sample signal matching the first voice signal;
  subtracting other noise value in each frame frequency domain signal from each frame frequency domain signal to obtain an effective frequency domain signal of each frame;
  performing inverse Fourier transform on the effective frequency domain signal of each frame to obtain an effective time domain signal of each frame; and
  combining the effective time domain signal of each frame in sequence to obtain the effective voice signal.

9. The electronic device according to claim 6, wherein prior to the filtering out an environmental noise signal in an original input signal according to an interference signal related to the environmental noise signal in the original input signal, the processor further used for:
  collecting the original input signal through a first microphone within a first specified distance from a sound source; and
  collecting the interference signal through a second microphone outside the first specified distance and within a second specified distance from the sound source;
  and wherein the second specified distance is greater than the first specified distance.

10. The electronic device according to claim 6, wherein when filtering out an environmental noise signal in an original input signal according to an interference signal related to the environmental noise signal in the original input signal to obtain a first voice signal, the processor is specifically used for:
  filtering out environmental noise signal in the original input signal by adopting a least mean square algorithm according to the interference signal related to the environmental noise signal in the original input signal to obtain the first voice signal.

* * * * *